United States Patent [19]

Sakakibara et al.

[11] Patent Number: 4,979,930

[45] Date of Patent: Dec. 25, 1990

[54] ENDLESS BELT FOR TRANSMISSION

[75] Inventors: Shiro Sakakibara; Yoshinori Miyaishi, both of Anjo, Japan

[73] Assignee: Aisin AW Co., Ltd., Japan

[21] Appl. No.: 448,264

[22] Filed: Dec. 11, 1989

[30] Foreign Application Priority Data

Dec. 16, 1989 [JP] Japan .................. 63-318136

[51] Int. Cl.⁵ .............................................. F16G 1/22
[52] U.S. Cl. .................................................. 474/242
[58] Field of Search ............... 474/201, 237, 240, 242, 474/244, 245

[56] References Cited

U.S. PATENT DOCUMENTS

| | | | |
|---|---|---|---|
| 4,618,338 | 10/1986 | Rattunoe et al. | 474/242 X |
| 4,642,077 | 2/1987 | Hattori et al. | 474/242 X |
| 4,698,050 | 10/1987 | Hattori et al. | 474/242 |
| 4,822,323 | 4/1989 | Miyaishi et al. | 474/242 |
| 4,891,039 | 1/1990 | Hattori et al. | 474/242 |

Primary Examiner—Thuy M. Bui
Attorney, Agent, or Firm—Lorusso & Loud

[57] ABSTRACT

An endless belt 1 for transmission is provided with a number of blocks 2, 3 which frictionally engage input and output pulleys, and vibration-absorbing members 6, 7 are interposed between mutually adjacent ones of the blocks 2, 3. The vibration-absorbing members 6, 7 are constituted by a first retainer 6 which clamps one block 2 of the mutually adjacent blocks 2, 3, and a second retainer 7 which clamps the other block 3, these retainers being intervening between the mutually adjacent blocks 2, 3. Accordingly, neighboring blocks 2, 3 are reliably prevented by the vibration-absorbing members 6, 7 from directly colliding with each other, as a result of which noise can be effectively reduced. In addition, vibration produced by the block 2 itself is absorbed by the first retainer 6 constituting the vibration-absorbing member. Likewise, vibration produced by the other block 3 itself is absorbed by the second retainer 7.

4 Claims, 4 Drawing Sheets

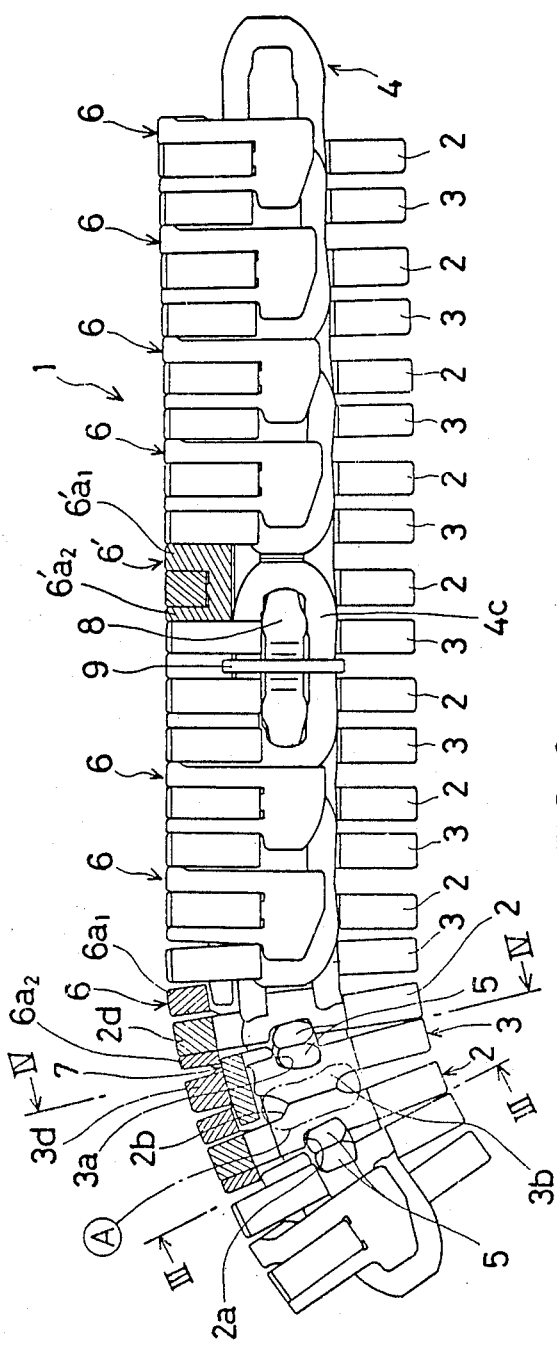
FIG. 1
FIG. 2
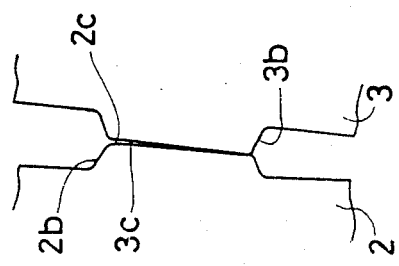
FIG. 5

FIG. 6(A)
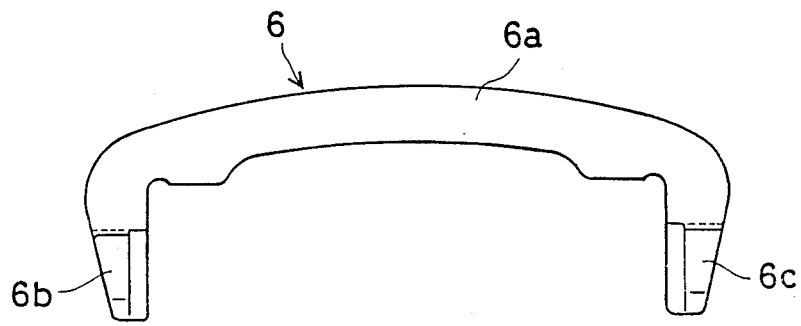
FIG. 6(B)
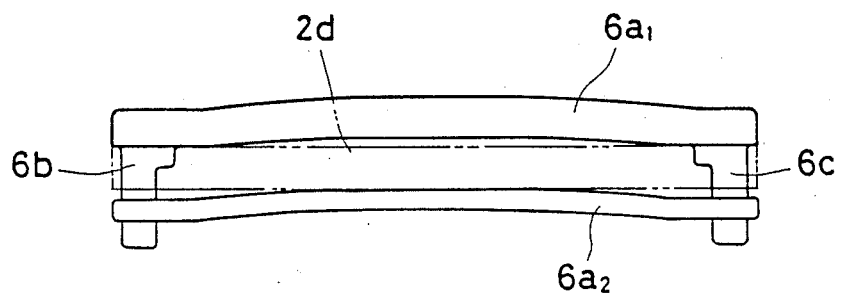
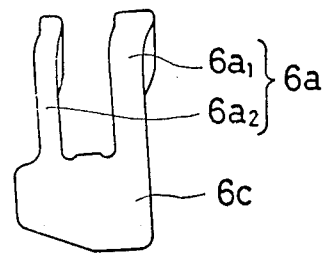
FIG. 6(C)

FIG. 7(A)
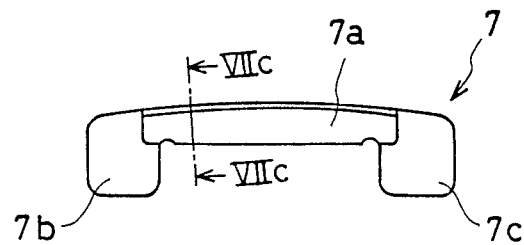
FIG. 7(B)
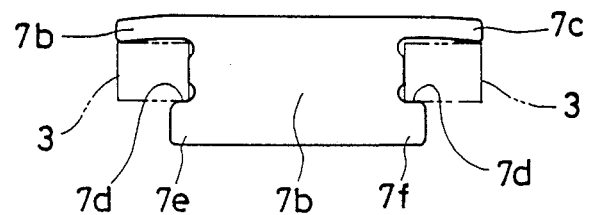
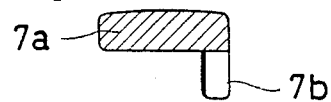
FIG. 7(C)

4,979,930

ENDLESS BELT FOR TRANSMISSION

BACKGROUND OF THE INVENTION

This invention relates to an endless belt for transmission employed in a belt-type stepless transmission used in automotive vehicles and the like, in which an endless belt is stretched between an input pulley and an output pulley and stepless shifting is performed by varying the radius of the position of frictional engagement between the endless belt and the input and output pulleys.

Stepless transmissions have been developed in order to facilitate driving and obtain a comfortable driving feeling in automotive vehicles.

One example of such a stepless transmission that has been conceived is a belt-type stepless transmission which relies upon an endless belt. The belt-type stepless transmission is so adapted that an input pulley disposed on the output-shaft side of a starting device and an output pulley disposed on the output-shaft side of a transmission are connected by an endless belt. The position of frictional engagement between each pulley and the endless belt is suitably controlled to continuously vary the transmission (gear) ratio, thereby accomplishing shifting in stepless fashion.

One example of an endless belt employed in such a belt-type stepless transmission is as disclosed in the specification of Japanese Patent Application Laid-Open (KOKAI) No. 63-115939. The disclosed stepless belt includes a number of flat plate-shaped blocks which frictionally engage input and output pulleys, a number of link pieces which pass through holes in the blocks and are endlessly connected by pins, and a member which prevents the pins from slipping out of the link pieces.

The endless belt comprising the number of blocks is such that at the time of power transmission, power is transmitted from the input pulley to the block pieces which frictionally engage the input pulley. The power transmitted to the block pieces is transmitted to the output pulley via the link pieces and the blocks frictionally engaged with the output pulley. In this case, a stepless shifting operation is performed by so executing control as to continuously vary the rotational radius of the position of engagement between the input pulley and the blocks and the rotational radius of the position of engagement between the output pulley and the blocks.

When the blocks frictionally engage the input and output pulleys at power transmission in this disclosed endless belt, or when the blocks or disengaged from the input and output pulleys, the load applied to the blocks changes, causing neighboring blocks to collide with each other. Such collision produces vibration and noise. In particular, since the blocks generally are made of metal and the endless belt is rotated at comparatively high speed, the sound of neighboring blocks colliding is very loud and unpleasant.

In addition, the blocks themselves vibrate at engagement and disengagement of the blocks and input and output pulleys, and this vibration is also a source of noise.

SUMMARY OF THE INVENTION

An object of the present invention is to reliably prevent collision between neighboring blocks in an endless belt for transmission.

Another object of the present invention is to absorb vibration of the blocks themselves.

In order to attain the foregoing objects, the present invention provides an endless belt for transmission characterized in that the endless belt is equipped with a number of blocks which frictionally engage input and output pulleys, with a vibration-absorbing member being interposed between mutually adjacent ones of the blocks.

The present invention is further characterized in that each vibration-absorbing member interposed between mutually adjacent blocks comprises a first retainer which clamps one of the mutually adjacent blocks and a second retainer which clamps the other of the mutually adjacent blocks.

The present invention is further characterized in that at least one of the first and second retainers is formed to have a portion for preventing slip out of pins which connect a number of link pieces of the endless belt.

The present invention is further characterized in that at least one of the first and second retainers is formed to have a curved portion for coming into abutting contact with the blocks.

In accordance with the endless belt of the present invention thus constructed, a vibration-absorbing member is interposed between mutually adjacent ones of the blocks, as a result of which direction collision between neighboring blocks is reliably prevented. Accordingly, noise produced by block collision can be effectively reduced.

Further, in accordance with the present invention, not only is collision between neighboring blocks prevented, but vibration produced by one of the mutually adjacent blocks itself is absorbed by the first retainer constituting the vibration-absorbing member. At the same time, vibration produced by the other of the mutually adjacent blocks itself is absorbed by the second retainer. As a result, noise produced by the blocks themselves can also be reliably reduced.

Further, in accordance with the present invention, at least one of the first and second retainers is formed to have a portion for preventing slip-out of pins which connect the link pieces of the endless belt. This makes it unnecessary to separately provide pin retaining members. Accordingly, not only can the number of component parts be reduced, but it is also possible to reduce the labor involved in assembly.

Further, in accordance with the present invention, the retainer is formed to have a curved portion. Therefore, even if the retainer should happen to have a slight dimensional error due to manufacture, the retainer will come into abutting contact with the blocks reliably by virtue of the curved portion. This means that the dimensional precision of the retainer need not be maintained so strictly. As a result, the retainer can be manufactured in a simple manner and can be assembled simply as well.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a view partially illustrating an endless belt for transmission according to the present invention;

FIG. 2 is an enlarged view of a portion A shown in FIG. 1;

FIG. 5 a front view of a link piece;

FIG. 6A –6–C illustrates a first retainer, in which FIG. 6A is a front view, FIG. 6B a plan view and FIG. 6C is a side view; and FIG. 7A-7C illustrates a second retainer, in which FIG. 7A is a front view, FIG. 7B a plan view and FIG. 7C a sectional view taken along line VIIC—VIIC in FIG. 7(A).

DESCRIPTION OF THE PREFERRED EMBODIMENT

A preferred embodiment of the present invention will now be described with reference to the drawings.

As shown in FIG. 1, and endless belt 1 in accordance with the present invention includes a number of alternately arranged flat, plate-shaped first and second blocks 2, 2, ...; 3, 3, .... Each first block 2 is formed to have a recess $2a$ approximately at the center of one side face, and a projection $2b$ approximately at the center of its other side face. As apparent from FIG. 2, the projection $2b$ has an edge $2c$ defining a slightly curved surface. In this case, the curved surface $2c$ has a smoothly continuous shape. As evident from FIG. 3, each first block 2 comprises an outer portion $2d$ extending transversely of the endless belt 1, an inner portion $2e$ extending transversely of the endless belt 1, and a pair of connecting portions $2f, 2f$ connecting the outer and inner portions $2d, 2e$ Left and right edges $2e_1, 2e_2$ of the inner portion $2e$ and left and right edges $2d_1, 2d_2$ of the outer portion $2d$ each are designed to form a straight line. Moreover, these left and right edges are formed so as to describe a V-shaped configuration, i.e., in such a manner that the block 2 narrows toward its inner side (the lower side in FIG. 3).

Figure 4:
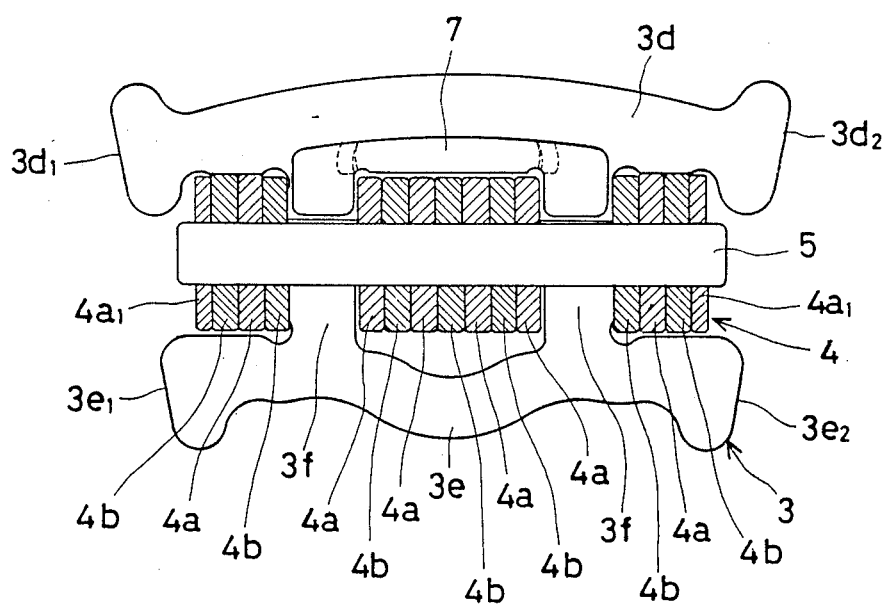
FIG. 4 is a sectional view taken along line IV—IV of a FIG. 1.

As clearly shown in FIGS. 1, 2 and 4, the second block 3 is formed to have substantially the same shape as that of the first block 2. That is, the only difference between the first and second blocks is that whereas the edge $2c$ of the projection $2b$ on the first block 2 defines a curved surface, an edge $3c$ of a projection $3b$ on the second block 3 defines a simple flat surface. A recess $3a$, outer portion $3d$, inner portion $3e$, a pair of connecting portions $3f, 3f$ left and right edges $3d_1, 3d_2$ of the outer portion $3d$, and left and right edges $3e_1, 3e_2$ of the inner portion $3e$ are formed to be exactly the same as their counterparts in the first block 2.

The first and second blocks 2, 3 are so disposed that their respective projections $2b, 3b$ come into abutting contact with each other. Accordingly, the first block 2 and second block 3 are adapted to turn relative to each other owing to the curved surface $2c$ of the first block 2.

Figure 3:
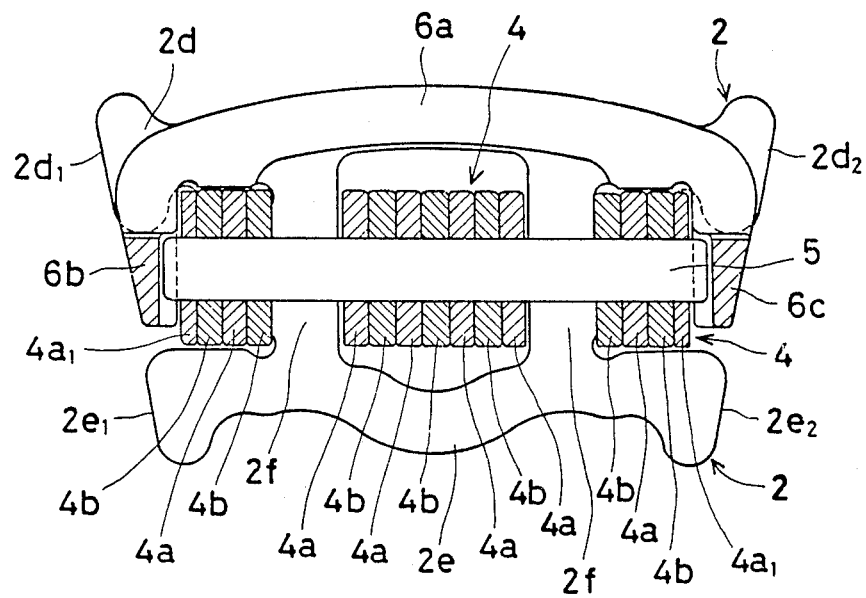
FIG. 3 is a sectional view taken along line III—III of FIG. 1.

As illustrated in FIGS. 1, 3 and 4, the inner and outer portions $2e, 2d$ and connecting portions $2f, 2f$ of the first block 2 define an interior space, as do the inner and outer portions $3e, 3d$ and connecting portions $3f, 3f$ of the second block 3. A number of link pieces 4, 4, ... arranged along the length of the endless belt 1 are disposed in these interior spaces. In this case, the link pieces are so arranged that a front end of a link piece $4a$ and a rear end of a neighboring link piece $4b$ overlap each other. As shown in FIG. 5, each link piece 4 is formed of a generally elliptical, ring-shaped flat plate. Outermost link pieces $4a_1, 4a_1$ are thinner than the other link pieces $4a, 4b$. More specifically, the number of link pieces constituting the link pieces $4b$ is one less than the number of link pieces constituting the link pieces $4a$. However, since the dimensions of each of the link pieces $4a, 4b$ are set in such a manner that the total strength of the link pieces $4b$ is capable of withstanding the force applied to the link pieces, the strength of the link pieces $4a$ is enlarged by an amount corresponding to one link piece. Therefore, in order to make the total strength of the link pieces $4a$ approximately equal to the total strength of the link pieces $4b$, the thicknesses of the two link pieces $4a_1, 4a_2$ are reduced. These thin link pieces $4a1, 4a2$ need not necessarily be disposed at the outermost ends but can be provided at any positions between the outer ends. In addition, the thin link pieces are not limited to two in number, for it is permissible to use one or a plurality thereof.

Holes are formed in the portions where the front ends of the set of link pieces $4a$ and the rear ends of the set of link pieces $4b$ overlap each other, and a pair of pins 5, 5 are provided so as to pass through these holes. Both ends of the pair of pins 5, 5 pass through spaces formed by the recesses $2a, 3a$ of the first and second blocks 2, 3, respectively. Each pin 5 has one side face thereof formed into a planar surface, while the other side face thereof defines a columnar surface. These two faces are smoothly connected by a separate plurality of columnar surfaces, and the pins 5, 5 are provided in such a manner that the columnar surfaces thereof come into abutting contact with each other. The flat surface sides of the pins 5 abut against the bottom surfaces of the recesses $2a, 3a$ in the first and second blocks 2, 3, respectively. Accordingly, the arrangement is such that the first and second blocks 2, 3 turn relative to each other, within a predetermined range, along the columnar surfaces of the pins 5.

As clearly shown in FIGS. 1 and 3, each first block 2 is provided with a first retainer 6. As illustrated in FIG. 6(A), the first retainer 6, which comprises an upper portion $6a$ as well as left- and right-side portions $6b, 6c$, respectively, is formed into a generally inverted U-shaped configuration as seen from the front side. As evident from FIG. 6(C), the upper portion $6a$ is composed of a pair of a first upper portion $6a_1$ and a second upper portion $6a_2$ projecting upwardly substantially in parallel. These first and second upper portions $6a1, 6a2$ are formed so as to curve somewhat in one direction (upwardly in the drawing), as clearly depicted in FIG. 6(B). The first retainer 6 is formed by injection molding a synthetic resin. Instead of a resin, however, it is permissible to employ a material which is resilient and readily absorbs vibration.

The first retainer 6 is press-fitted into the first block 2 in such a manner that the outer portion $2d$ of the first block 2 is situated between the first and second upper portions $6a_1, 6a_2$. In such case, owing to the curvature of the first and second upper portions $6a_1, 6a_2$, reliable abutting contact is made with the outer portion $2d$ of the first block 2 at least at three points and the outer portion $2d$ is resiliently clamped, as depicted in FIG. 6(B). Accordingly, the dimensional precision of the first block 2 need not be especially high.

As illustrated in FIG. 3, the left- and right-side portions $6b, 6c$ of the first retainer 6 are disposed so as to cover the left and right ends of the pair of pins 5, 5. Thus, the left- and right-side portions $6b, 6c$ are capable of preventing the pins 5 from slipping out of each block and link piece. In other words, the left- and right-side portions 6b, 6c serve as portions which prevent slip-out of the pin 5.

Further, as clear from FIGS. 1 and 4, the second block 3 is provided with a second retainer 7. As illustrated in FIGS. 7(A) and (C), the second retainer 7, which comprises an upper portion 7a as well as left- and right-side portions 7b, 7c, respectively, is formed into a generally inverted U-shaped configuration as seen from the front side and an inverted L-shaped configuration as seen from the side. As is apparent from FIG. 7(B), the upper portion 7a is formed to have left and right recesses 7d, 7d, and the side portions 7b, 7c are curved somewhat in the direction of the recesses 7d, 7d (downward in the drawing). The second retainer 7 is formed of the same material as that of the first retainer 6 and by the same method of manufacture.

As shown in FIG. 7(B), the second retainer 7 is press-fitted into the second block 3 in such a manner that the second block 3 fits into the left and right recesses 7d, 7d. The side portions 7b, 7c and left and right projections 7e, 7f of the upper portion 7a resiliently clamp the second block 3. Since the side portions 7b, 7c are curved somewhat in the direction of the recesses 7d, the side portions 7b, 7c and the projections 7e, 7f reliably abut against the second block 3. Accordingly, the dimensional precision of the second block 2 need not be especially high.

It is arranged so that the front ends of the link pieces 4b, 4b, ... are alternately overlapped by the rear ends of the next link pieces 4a, 4a, ..., and in a manner similar to that set forth above, a pair of pins 5, 5 pass through holes formed in these overlapping portions. These pins 5, 5 also pass through spaces defined by the recesses 2a, 3a of the next first and second blocks 2, 3. Thus, the two sets of link pieces 4a, 4a, ...; 4b, 4b, ... are alternately connected by the pair of pins 5, 5, and the pins 5, 5 are supported by the first and second blocks, 2, 3, whereby the first and second blocks 2, 3, link pieces 4a, 4b, pins 5, 5 and first and second retainers 6, 7 are assembled to form a belt. As shown in FIG. 1, link pieces 4c, 4c,... are attached to pins 5, 5; 5, 5, which are at both ends of the belt-shaped assembly, pin retainers 8, 8 are applied to both the left and right ends of these pins (the pin retainer situated on the opposite side is not shown), and the left and right pin retainers 8, 8 are clamped by a C-shaped clip 9, thereby forming the endless belt 1.

In the endless belt 1 thus formed, either of the first and second upper portions 6a₁, 6a₂ of the first retainer 6 is always interposed from the central portion to the outer portion between the first block 2 and second block 3. Further, as depicted in FIG. 1, a third retainer 6' is attached to the second block 2 situated at a portion formed into the endless shape last. The third retainer 6' also is formed to include a first upper portion 6'a₁ and a second upper portion 6'a₂, which are interposed between the first and second blocks 2, 3. Unlike the first retainer 6, the third retainer 6' is not formed to have a portion which prevents the pins 5 from falling out.

In order that the endless belt 1 can curve at a predetermined radius, no retainer is interposed between the blocks 2, 3 on the inner side of the belt 1. However, the design is such that a small gap is provided so that mutually adjacent ones of the blocks 2, 3 will not make contact when the rotational radius of the endless belt 1 is at its minimum value.

The endless belt 1 is stretched between an input pulley and an output pulley in a belt-type stepless transmission. Owing to rotation of the input pulley, the endless belt 1 rotates and the rotation thereof is transmitted to the output pulley, which rotates as a result. At this time the first and second blocks 2, 3 rotate relative to each other about the pins 5 or the abutting contact portions of the projections 2b, 3b from the moment each pulley is about to be frictionally engaged by the belt until the moment the belt disengages from the pulley. When the endless belt 1 frictionally engages each pulley or when it disengages from the pulley, the first block 2 or second block 3 attempts to contact the neighboring block 3 or 2. However, since the first upper portions 6a₁, or 6'a₁ or second upper portions 6a₂, 6'a₂ of the first and third retainers 6, 6' are interposed between these blocks 2, 3, the first block 2 and second block 3 never come into direct contact with each other. Accordingly, collision between neighboring blocks 2, 3 to produce vibration or noise almost never occurs. Moreover, since the first and second upper portions 6a₁, 6a₂ are curved, the first and second upper portions 6a₁, 6a₂ deform elastically when pressed by the blocks 2, 3. This absorbs and mitigates any impact.

In addition, since the first retainer 6 comes into abutting contact with the first block 2 and the second retainer 7 comes into abutting contact with the second block 3, vibration ascribable to the blocks 2, 3 themselves can be effective absorbed.

Thus, the first, second and third retainers 6, 7 and 6', respectively, construct a vibration-absorbing member which is a characterizing feature of the present invention.

Thus, as is evident from the foregoing description, the endless belt of the present invention is such that a vibration-absorbing member is interposed between blocks. As a result, when the endless belt is running, mutually adjacent blocks no longer come into direct contact. This makes it possible to effectively reduce vibration and noise.

Further, the vibration-absorbing member is brought into abutting contact with each block. Therefore, when each block engages or disengages with a pulley, vibration produced by the block itself can be reliably absorbed by the vibration-absorbing member.

As many apparently widely different embodiments of the present invention can be made without departing from the spirit and scope thereof, it is to be understood that the invention is not limited to the specific embodiments thereof except as defined in the appended claims.

What we claim is:

1. An transmission endless belt for transmitting torque between an input pulley disposed on an output-shaft side of a starting device and an output pulley disposed on an output-shaft side of a stepless transmission, comprising:

a number of plate-shaped blocks each having an inclined contact surface for frictionally engaging said input pulley and said output pulley;

one or more link trains for interconnecting said blocks; and a vibration-absorbing member interposed between mutually adjacent blocks.

2. The endless belt according to claim 1, wherein said vibration-absorbing member interposed between mutually adjacent blocks comprises a first retainer which clamps one of said mutually adjacent blocks and a second retainer which clamps the other of said mutually adjacent blocks.

3. The endless belt according to claim 2, wherein at least one of said first and second retainers is formed to have a portion for preventing slip-out of pins which connect a number of link pieces of said link train.

4. The endless belt according to claim 1, wherein at least one of said first and second retainers is formed to have a curved portion for coming into abutting contact with the block clamped by said retainer.

* * * * *